310-12 SR

FIP8502 XR 3,697,908

United States Patent

Highsmith

[15] 3,697,908

[45] Oct. 10, 1972

[54] FERROMAGNETIC MATERIAL IN A MAGNETIC FIELD AS A PROPULSION SYSTEM

[72] Inventor: Phillip E. Highsmith, 388 Lake Forest Drive, Spartanburg, S.C. 29302

[22] Filed: Dec. 22, 1969

[21] Appl. No.: 887,088

[52] U.S. Cl. ....................................335/209, 310/12

[51] Int. Cl. ..............................................H01f 7/00

[58] Field of Search ..................310/12, 14; 335/209

[56] References Cited

UNITED STATES PATENTS 2,783,684 3/1957 Yoler......................310/12 X 3,125,964 3/1964 Silverman................310/12 X 3,300,744 1/1967 Deutsch...................310/14 X

*Primary Examiner*—George Harris

*Attorney*—Wellington M. Manning, Jr.

[57] ABSTRACT

A method and apparatus are disclosed for propelling a ferromagnetic containing vehicle along a predetermined path. A current carrying coil is provided around at least a portion of the predetermined path of travel of the vehicle. A magnetic field is created within the coil which produces a magnetic force on the ferromagnetic material containing vehicle passing therethrough. By continuously moving the magnetic field along the length of the coil, the vehicle responds in movement to the direction of movement of the magnetic field.

12 Claims, 4 Drawing Figures

PATENTED OCT 10 1972 3,697,908

SHEET 1 OF 2

FIG. I

INVENTOR.
PHILIP E. HIGHSMITH
BY Wellington M. Manning, Jr.
ATTORNEY

INVENTOR.
PHILLIP E. HIGHSMITH
BY
Wellington M. Manning, Jr.
ATTORNEY

FERROMAGNETIC MATERIAL IN A MAGNETIC FIELD AS A PROPULSION SYSTEM

BACKGROUND OF THE INVENTION

This invention relates to the acceleration of ferromagnetic materials in a magnetic field and more particularly to the use of acceleration of ferromagnetic material as a propulsion system.

If a piece of ferromagnetic material is inserted into an electric current carrying coil, the magnetic force on the ferromagnetic material will: (A) reach a maximum as the ferromagnetic material nears the entrance of the coil; (B) drop to zero as the magnetic center of the ferromagnetic material is in the magnetic center of the coil; (C) reverse direction as the center of the ferromagnetic material continues past the magnetic center of the coil; and (D) reach a maximum as the ferromagnetic material emerges from the opposite side of the coil. Therefore, the kinetic energy of said ferromagnetic material is not changed as it goes through the coil.

SUMMARY OF THE INVENTION

The object of the present invention is to provide an arrangement so that kinetic energy can be added to or taken from ferromagnetic material as said ferromagnetic material travels through an electrical current carrying coil.

It is understood that by definition the magnetic center of the coil and the magnetic center of the ferromagnetic material is that point of zero force described in (B) above.

It is also understood that the coil can be wound in any geometrical shape, such as a flat coil, a square helix, or a round helix.

It is also understood that the ferromagnetic material can be in any geometrical configuration that will fit inside the coil; however, the ferromagnetic material will usually be a part of a vehicle or container capable of carrying material from one point to another point.

It is further understood that the size of the vehicle is not to be restricted and can vary from a very small (as in the case of a toy) to a very large vehicle capable of carrying passengers or cargo.

It is further understood that a vehicle made entirely of ferromagnetic material, a vehicle made in part of ferromagnetic material or any ferromagnetic material in contact with the vehicle acts as a propulsive agent.

Another object of the present invention is to provide a more uniform force on the ferromagnetic material as it traverses the coil. A uniform force will provide a more constant acceleration as the vehicle is accelerated or decelerated.

Still another object of the present invention is to provide a system in which the propulsive force on the vehicle is supplied by parameters external to the vehicle rather than parameters connected with or dependent upon the vehicle. The present invention will not depend upon internal parameters such as motors, engines, the coefficient of friction between surfaces (which seriously limits the acceleration of propelled vehicles), or the reaction of a jet exhaust (which seriously limits the ability to evacuate a tube).

In high speed transport it is desirable to obtain positive and negative accelerations which can be provided by agents which do not depend upon coefficients of friction. Large positive and negative accelerations are possible using the present invention since the propulsive force is not a function of internal parameters as described in the proceding paragraph. In pre-testing the present invention, accelerations of 144 ft/sec$^2$ were easily obtained.

In high speed transport, it is desirable to reduce air friction. The present invention provides a system in which the vehicle could travel in near vacuum conditions.

The above and other objects of the present invention will become apparent from a reading of the following description taken in conjunction with the accompanying drawing.

DESCRIPTION OF THE PREFERRED EMBODIMENTS

Figure 1:
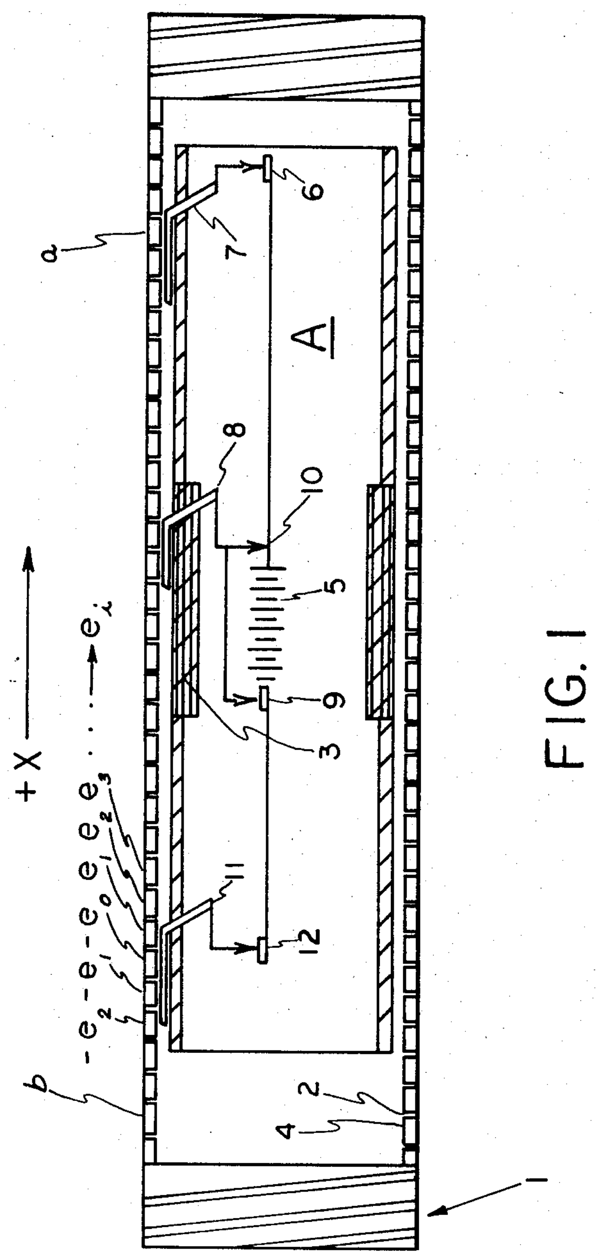
FIG. 1 is a partial side cross sectional view of a vehicle and coil, illustrating the principles according to the teachings of the present invention.

Referring to FIG. 1 which illustrates a section view of the accelerating section of the present invention, conducting wire of quadrilateral cross section 4 is insulated on one side 2, and then helically wound and bonded together to form tube 1. The insulation may be, but does not have to be, the bonding agent. Thus made, the inside of the tube will be composed of alternate helical elements of conductor and non-conductor. At the given points, $e_1$, $e_2$, $e_3$, $-e_t$, electrical connections can be made.

The vehicle A that fits inside the tube can be completely or partly out of ferromagnetic material. In the drawing only the center shell 3 is composed of ferromagnetic material and the rest of the vehicle is composed of non-ferromagnetic material. However, it should be understood the amount and placement of the ferromagnetic material in the vehicle is to be unrestricted.

In order to accelerate the vehicle, current is introduced in the coil at the variable point *a* and removed at the variable point *b*. The positions of points *a* and *b* relative to the ferromagnetic center of the vehicle will determine the magnitude and the direction of the force on the vehicle. If points *a* and *b* are equidistant from the magnetic center of the vehicle, the force causing translation movement is zero. If point *a* is at a greater distance from the magnetic center of the vehicle than point *b*, the acceleration of the vehicle will be in the direction of point *a*. Therefore, the vehicle can be positively, negatively, or zero accelerated by changing the positions of *a* and *b* relative to the magnetic center of the vehicle.

There are several ways points *a* and *b* can be positioned relative to each other to produce a force on the ferromagnetic vehicle. One method is to position point *a* ahead of the vehicle in the direction of the desired acceleration and allow point *b*, which is nearer the ferromagnetic center of the vehicle to approach point $a$. The impedance between points $a$ and $b$ will diminish causing the current between $a$ and $b$ to increase if the voltage between $a$ and b $b$ kept at a constant value.

Another method is to position point $b$ at one end of an entire accelerating section of the coil and position point $a$ at the other end of the accelerating section of the coil. As the ferromagnetic vehicle approaches the coil, the entire accelerating section is activated by a voltage between $a$ and $b$. As the ferromagnetic center of the vehicle nears the ferromagnetic center of the coil, the current is cut off just before the magnetic force changes direction. Several vehicles could be grouped together to form a train; some of which would be ferromagnetic vehicles and some which would be non-ferromagnetic. Forming a train would allow a greater separation of accelerating sections if separation of accelerating sections is desired. (For example, a train one mile long would need an accelerating section approximately every mile to sustain a constant force on the train.)

Still another method (which is the method I describe in conjunction with the submitted drawing) is to position points $a$ and $b$ so that the points remain more or less stationary relative to the ferromagnetic vehicle but move relative to the tube with the same velocity as the velocity of the ferromagnetic vehicle. The distance between $a$ and $b$ can remain constant. The impedance between $a$ and $b$ will be approximately constant, and the force on the vehicle can be varied by varying the current in the activated segment of the helix. In the simplest sense, it can be said that the ferromagnetic vehicle is chasing (or is locked in) a magnetic pulse that is traveling in the tube, the magnetic pulse being in front of the vehicle to accelerate the vehicle forward, and the magnetic pulse behind the vehicle to slow down or decelerate the vehicle.

As the velocity of the vehicle increases it may (in order to increase the efficiency of the system) be desirable to vary the distance between $a$ and the ferromagnetic center of the vehicle, or between $b$ and the ferromagnetic center of the vehicle or between $a$ and $b$.

There are many arrangements by which the points $a$ and $b$ can be made to travel relative to the tube with the same velocity as the vehicle is traveling relative to the tube. (For example: mechanical or electronic switching). The method will vary with the many different applications of the present invention. As an example, the enclosed drawing illustrates a method of mechanical switching.

The center shell of the vehicle 3 is composed of ferromagnetic material such as soft iron while the other parts of the vehicle are composed of non-ferromagnetic material. In order to accelerate the vehicle in the $+x$ direction, conventional current flows from the power supply 5 through switch 6. From switch 6, the current flows through a conductor onto electrical brush 7 and enters the helix coil. The current comes out of the coil at electrical brush 8 through a conductor through switch 9 to the negative side of the power supply 5. As the vehicle moves forward, the magnetic field of the helix also moves forward staying in front of the magnetic center of the vehicle.

In order to accelerate the vehicle in the $-x$ direction, conventional current flows from the positive side of the power supply through switch 10 onto the electrical brush 8 and enters the helix. The current leaves the helix at electrical brush 11 through switch 12 and onto the negative side of the power supply.

Figure 2:
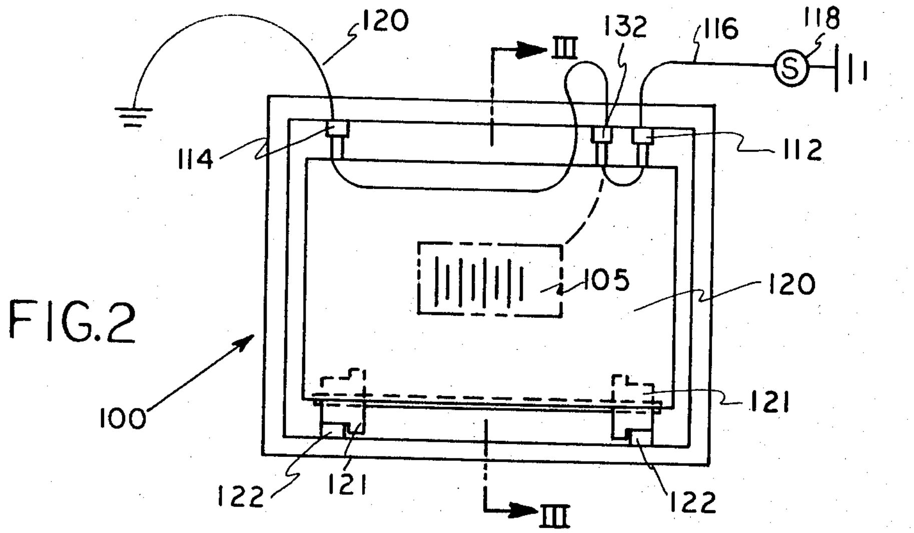
FIG. 2 is an end view of a further vehicle and coil arrangement according to the teachings of the present invention.
Figure 3:
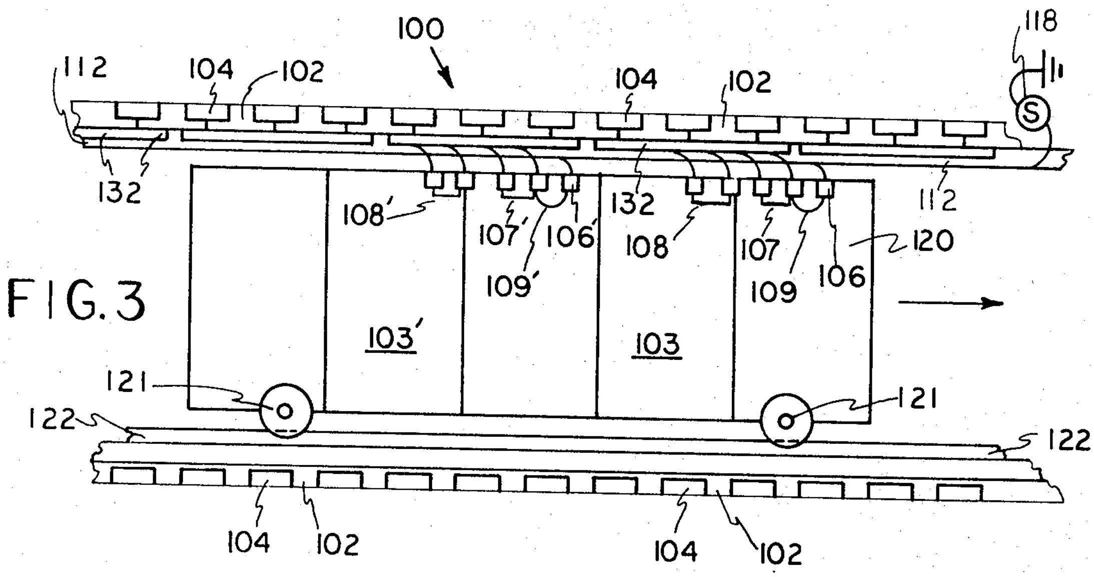
FIG. 3 is a side cross sectional view of the vehicle and coil as shown in FIG. 2 as taken along lines III—III.
Figure 4:
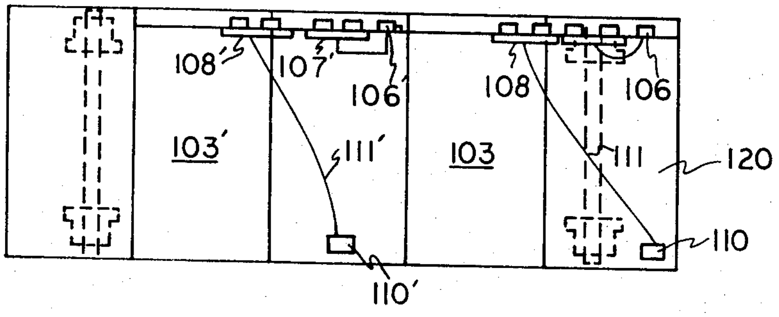
FIG. 4 is a top plan view of a vehicle as shown in FIGS. 2 and 3.

FIGS. 2, 3 and 4 illustrate further the principle of the present invention. In FIGS. 2 and 3, a vehicle 120 is illustrated as being movingly supported by a plurality of wheels 121 on a track 122 within a tubular coil 100. Coil 100 is comprised of a plurality of conductors 104, each of which is separated in production of the coil by an insulating section 102.

Vehicle 120 is provided with a pair of ferromagnetic sections 103 and 103′. Apparatus attendent to ferromagnetic section 103 likewise applies to section 103′ and is shown with a prime symbol following the numbers. As such, only ferromagnetic section 103 will be discussed.

Ferromagnetic section 103 is provided with an electrical contact element 106 and a pair of switch sections 107 and 108. An electrical connector 109 electrically joins contact 106 to switch section 107. Switch sections 107 and 108 are adjustable lengthwise with respect to vehicle 120, and thus may be moved axially with respect to ferromagnetic section 103 so as to adjust the force applied thereto. A further contact 110 is provided for ferromagnetic section 103 and is associated with switch section 108 by an electrical connector 111. Contact 110 directs current from switch section 108 to ground. As mentioned above, ferromagnetic section 103′ is likewise provided with an electrical contact 106′, connector 109′, switch sections 107′ and 108′, contact 110′ and connector 111′.

Coil or helix 100 is provided with a plurality of conductive elements 104 positioned around the path of travel of the vehicle 120, each element 104 being insulated from the next adjacent element 104, though the conductors may be associated with adjacent or other conductors in the coil by switching means or the like so as to produce a desired force on the vehicle 120. As shown in FIG. 2, a pair of rails 112 and 114 are provided in the top of helix 100. Rail 112 is associated by a connector 116 to an alternating current power source 118. Rail 114 is united with ground by a connector 120. Also presented on the underside of the top of helix 100 are a plurality of contacts 132, each of which is electrically connected to one or more of the connectors 104 in the helix 100.

Operatively speaking, with the power source 118 actuated power is supplied to rail 112. As the vehicle moves into the helix 100, contact 106 engages rail 112 and permits current to pass therethrough. The current then passes through connector 109 to switch 107. Switch 107 as it engages one of the series of contacts 132 permits passage of current into a portion of the helix. The current in the helix then passes back through one of the contacts 132, through switch 108, across connector 111, through contact 110 and connector 120 to ground. A magnetic field or pulse is thus formed between switches 107 and 108. As mentioned earlier in the specification, a magnetic material entering a current carrying coil experiences a maximum force just prior to entering the coil. With the pulse between switches 107 and 108 being considered the coil, an attractive force is thus placed on ferromagnetic section 103 which moves vehicle 120 in the direction of the pulse or magnetic field. As the vehicle 120 moves forward, switchs 107 and 108 likewise move and the magnetic filed produced therebetween remains ahead of ferromagnetic section 103 to continue applying force thereon. Another way of stating the phenomena is that a magnetic field is produced between switches 107 and 108 and the field per se is moved along the coil as the switches engage the various contacts 132. The second ferromagnetic section 103' is provided with similar switching as just described and produces a second pulse that creates an attractive force on ferromagnetic material section 103'. Hence in the embodiment shown in FIGS. 2, 3 and 4, two attractive forces will be applied to the vehicle.

Insofar as the field contacts 132 are concerned, the series of contacts 132 as shown is just one example. As stated hereinbefore, it is feasible for the underside of the conductors 104 to be bared so as to enable contact between the conductors 104 and the switches 107 and 108 or to have an individual contact 132 therefor. As such, a new magnetic field is instituted as the vehicle moves along or the magnetic field between the individual conductors is moved along in front of the ferromagnetic section. Insofar as the magnitude of force is concerned, as mentioned earlier, the switches are adjustable along the length of the vehicle. Hence the switches may be moved forward or rearwardly with respect to ferromagnetic material section 103 so as to vary the position of the ferromagnetic material with respect to the entrance of the magnetic field. As such, the magnitude of force may be varied.

As shown in FIGS. 1 and 2, the power source 5 and 105 respectively may be contained within the vehicle or external thereof (118 in FIG. 2). As shown in FIG. 1 and in phantom in FIG. 2, an internal power source may be directly connected to one of the switch sections. Hence with an internal power source, the electrical contact 106 would not be required.

It is understood that electrical brushes 7, 8 and 11 of FIG. 1 can be a conducting wheel or any other efficient electrical contact. The same statement applies for the electrical brushes or switches as shown in FIGS. 2, 3 and 4. It is further understood the brushes will be positioned for maximum efficiency and may or may not be directly connected to the vehicle.

The power supply 5 is shown in FIG. 1 as being part of the vehicle. This is only one of many arrangements and it should be understood that it is not the intent of the inventor to restrict the power application to the arrangement shown in the drawing. If the vehicle travels on electrical conducting tracks the electrical power can be delivered to points *a* and *b* by the conducting tracks. (The current could flow from one track to point *a* through the helix to point *b* and back to the other track). If an electronic switching is desired a sensing device can detect the location of the vehicle and activate an electrical relay which will apply to a voltage between points *a* and *b*. (The sensing device could be a photoelectric cell or small secondary windings between $e_1, e_2, e_3, e_4, e_5 \rightarrow e_i$).

The current applied between point *a* and *b* can be either alternating or direct current.

It is also understood that the helix coil can be made in ways other than the method presented in the present invention, for example, winding wire helically on a tube, or by coating a non-conducting tube with conducting material and then cutting through the conducting material to form a helical coil, or by printing a conducting helical circuit upon a non-conducting tube. Present research indicates that the most economically feasible way is to manufacture the tube from the windings as presented in the accompanying drawing, since rather large ampere-windings are required.

I claim:

1. A method of propelling a ferromagnetic material containing vehicle along a predetermined path comprising:

a. providing a coil around at least a portion of the path of travel;

b. creating a magnetic field in the coil to produce a magnetic force on said vehicle; and c. continuously moving said magnetic field along said coil, whereby said vehicle responds in the direction of movement of said magnetic field.

2. A method of propelling a magnetic material containing vehicle along a predetermined path as defined in claim 1 wherein said vehicle is supported on a track.

3. A method of propelling a magnetic material containing vehicle as defined in claim 1 wherein a source of current for creating said magnetic field is contained within the vehicle.

4. A method of propelling a ferromagnetic material containing vehicle as defined in claim 1 wherein a source of current for creating a magnetic field in the coil is external of the vehicle, the current passing through said vehicle into said coil.

5. A method of propelling a ferromagnetic material containing vehicle as defined in claim 1 wherein contacts are provided on said vehicle for moving said magnetic field.

6. A method of propelling a ferromagnetic material containing vehicle as defined in claim 5 wherein said contacts are variable with respect to the magnetic center of said vehicle.

7. A magnetic propulsion apparatus comprising:

a. a current carrying coil, said coil defining at least a portion of a path of intended travel of a vehicle;

b. a current source for creating a magnetic field within said coil; and c. a vehicle movably receivable in said coil to pass therethrough, said vehicle containing at least in part a ferromagnetic material, said vehicle further having received thereon means to constantly vary current flow into said coil whereby a magnetic field produced in said coil is constantly moved during passage of said vehicle therethrough.

8. A magnetic propulsion apparatus as defined in claim 7 wherein the current varying means comprise at least one contact received on said vehicle.

9. A magnetic propulsion apparatus as defined in claim 7 wherein said vehicle has received thereon two contacts, at least one of which passes current into the coil and the other of which takes current out of said coil.

10. A magnetic propulsion apparatus as defined in claim 9 wherein the contacts are variable with respect to the magnetic center of said vehicle.

11. A magnetic propulsion apparatus as defined in claim 7 comprising further a track for supporting said vehicle, said current source being operatively associated with said track so as to supply current through said vehicle to a selected portion of said coil.

12. A magnetic propulsion apparatus as defined in claim 7 wherein said current source is positioned internally of said vehicle.

* * * * *